(12) United States Patent
Handige Shankar et al.

(10) Patent No.: US 10,243,778 B2
(45) Date of Patent: Mar. 26, 2019

(54) METHOD AND SYSTEM FOR DEBUGGING IN A SOFTWARE-DEFINED NETWORKING (SDN) SYSTEM

(71) Applicant: Telefonaktiebolaget L M Ericsson (publ), Stockholm (SE)

(72) Inventors: Ganesh Handige Shankar, Bangalore (IN); Deepthi V V, Kannur (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 220 days.

(21) Appl. No.: 14/823,287

(22) Filed: Aug. 11, 2015

(65) Prior Publication Data

US 2017/0048126 A1 Feb. 16, 2017

(51) Int. Cl.
*H04L 12/24* (2006.01)
*H04L 12/26* (2006.01)

(52) U.S. Cl.
CPC ........ *H04L 41/0622* (2013.01); *H04L 41/069* (2013.01); *H04L 43/045* (2013.01)

(58) Field of Classification Search
CPC .. H04L 41/0622; H04L 41/069; H04L 43/045
See application file for complete search history.

(56) References Cited

U.S. PATENT DOCUMENTS

| | | | |
|---|---|---|---|
| 9,185,170 B1 * | 11/2015 | Grammel | H04L 43/0811 |
| 9,379,981 B1 * | 6/2016 | Zhou | H04L 47/125 |
| 9,419,874 B2 * | 8/2016 | Sun | H04L 43/0829 |
| 9,578,050 B1 * | 2/2017 | Barabash | H04L 63/20 |
| 9,641,459 B2 * | 5/2017 | Guo | H04L 43/04 |
| 9,787,559 B1 * | 10/2017 | Schroeder | H04L 41/5038 |
| 2014/0112187 A1 * | 4/2014 | Kang | H04L 43/024 370/253 |
| 2014/0241362 A1 * | 8/2014 | Bosshart | H04L 69/22 370/392 |

(Continued)

OTHER PUBLICATIONS

J. Postel, "User Datagram Protocol," Aug. 28, 1980, 3 pages, RFC: 768.

(Continued)

*Primary Examiner* — Blake J Rubin
(74) *Attorney, Agent, or Firm* — Nicholson De Vos Webster & Elliott LLP

(57) ABSTRACT

Temporal matching based debugging methods are disclosed. In one embodiment, the method is implemented in a software-defined networking (SDN) controller coupled to a SDN system. The SDN system contains a set of network devices managed by the SDN controller, the method includes recording, at the SDN controller, messages between the SDN controller and a network device. The method further includes obtaining at the SDN controller from the network device, a set of statistics from the network device, where the set of statistics indicates characteristics of packet processing at the network device. The method further includes temporally matching the set of statistics obtained from the network device with the messages recorded, and identifying, among the messages recorded at the SDN controller, one or more messages occurred when the set of statistics indicates a packet processing anomaly in the network device.

20 Claims, 9 Drawing Sheets

(56) References Cited

U.S. PATENT DOCUMENTS

| | | | |
|---|---|---|---|
| 2014/0244966 A1* | 8/2014 | Bosshart | H04L 49/90 711/206 |
| 2014/0281669 A1* | 9/2014 | DeCusatis | G06F 11/2005 714/4.11 |
| 2014/0325649 A1* | 10/2014 | Zhang | H04L 43/024 726/23 |
| 2014/0351801 A1* | 11/2014 | Shin | G06F 8/41 717/151 |
| 2014/0355436 A1* | 12/2014 | Zhang | H04L 47/10 370/232 |
| 2015/0009830 A1* | 1/2015 | Bisht | H04L 47/125 370/236 |
| 2015/0012484 A1* | 1/2015 | Jindal | G06F 17/30289 707/609 |
| 2015/0172208 A1* | 6/2015 | DeCusatis | H04L 47/70 709/226 |
| 2015/0195126 A1* | 7/2015 | Vasseur | H04L 41/5025 370/218 |
| 2015/0195183 A1* | 7/2015 | Park | H04L 45/021 709/242 |
| 2015/0288586 A1* | 10/2015 | McClellan | H04L 41/142 709/224 |
| 2016/0014787 A1* | 1/2016 | Zhang | H04W 4/70 370/329 |
| 2016/0050117 A1* | 2/2016 | Voellmy | H04L 12/6418 370/392 |
| 2016/0050132 A1* | 2/2016 | Zhang | H04L 29/08153 370/252 |
| 2016/0105364 A1* | 4/2016 | Kanonakis | H04L 47/10 370/235 |
| 2016/0112503 A1* | 4/2016 | Yang | H04L 12/6418 709/223 |
| 2016/0285706 A1* | 9/2016 | Rao | H04L 43/028 |
| 2016/0294871 A1* | 10/2016 | Huston | H04L 63/1458 |
| 2016/0352815 A1* | 12/2016 | Mozolewski | H04L 43/0882 |
| 2016/0352865 A1* | 12/2016 | Gupta | H04L 67/42 |
| 2017/0026292 A1* | 1/2017 | Smith | H04L 43/16 |
| 2017/0142010 A1* | 5/2017 | Mathew | H04L 12/6418 |
| 2017/0171039 A1* | 6/2017 | Su | H04L 43/04 |
| 2017/0171050 A1* | 6/2017 | Puzis | H04L 43/0876 |

OTHER PUBLICATIONS

"Transmission Control Protocol, DARPA Internet Program Protocol Specification," Sep. 1981, 91 pages, RFC: 793, Information Sciences Institute, University of Southern California, Marina del Rey, California.

T. Socolofsky, et al., "A TCP/IP Tutorial," Jan. 1991, 28 pages, Network Working Group, Request for Comments: 1180.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffserv Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.

B. Fenner, et al., "Management Information Base for the User Datagram Protocol (UDP)," Jun. 2005, 19 pages, Network Working Group, Request for Comments: 4113, The Internet Society.

S Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J Babiarz, et al., "Configuration Guidelines for DiffServ Service Classes," Aug. 2006, 57 pages, Network Working Group, Request for Comments: 4594, The Internet Society.

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

"Conformance Test Specification for Open Flow Switch Specification v1.3.4 Basic Single Table Conformance Test Profile Version 1.0", Open Networking Foundation, Apr. 15, 2015, pp. 1-399.

"OpenFlow Switch Specification Version 1.3.5 (Protocol version 0x04)", Open Networking Foundation, Mar. 26, 2015, pp. 1-177.

* cited by examiner

METHOD AND SYSTEM FOR DEBUGGING IN A SOFTWARE-DEFINED NETWORKING (SDN) SYSTEM

FIELD OF INVENTION

The embodiments of the invention are related to the field of networking. More specifically, the embodiments of the invention relate to a method and system for debugging in a software-defined networking (SDN) system.

BACKGROUND

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

A SDN system typically includes one or more SDN controllers (also referred to as network controllers, the terms are used exchangeably herein below) and a set of network elements managed by the SDN controllers. An anomaly in a network element ideally should be remotely debugged outside of the network element as the network element is often deployed near a client of the SDN system thus harder to reach (e.g., requiring a truck roll). Thus, a troubleshooting apparatus may be deployed inside or coupled to a SDN controller as the SDN controller communicates with the network element continuously, and the SDN controller may cause changes to and gets information changes from the network element. Thus, a more centralized debugging through monitoring the communications between the SDN and the network element is preferable. However, in a SDN system, typically thousands even millions of messages are exchanged between the SDN controller and the network element, and it is challenging to debug and identify what may have caused the anomaly.

SUMMARY

Temporal matching based debugging methods are disclosed. In one embodiment, the method is implemented in a software-defined networking (SDN) controller coupled to a SDN system. The SDN system contains a set of network devices managed by the SDN controller, the method includes recording, at the SDN controller, messages between the SDN controller and a network device. The method further includes obtaining at the SDN controller from the network device, a set of statistics from the network device, where the set of statistics indicates characteristics of packet processing at the network device. The method further includes temporally matching the set of statistics obtained from the network device with the messages recorded, and identifying, among the messages recorded at the SDN controller, one or more messages occurred when the set of statistics indicates a packet processing anomaly in the network device.

Apparatuses to debug using temporal matching are disclosed. In one embodiment, the apparatus serves as a SDN controller coupled to a SDN system. The SDN system contains a set of network devices managed by the SDN controller. The SDN controller comprises a processor and a non-transitory machine-readable storage medium that coupled to the processor. The non-transitory machine-readable storage medium contains instructions executable by the processor, where the SDN controller is operative to record messages between the SDN controller and a network device; obtain, from the network device, a set of statistics from the network device, wherein the set of statistics indicates characteristics of packet processing at the network device; temporally match the set of statistics obtained from the network device with the messages recorded; and identify among the messages recorded at the SDN controller, one or more messages occurred when the set of statistics indicates a packet processing anomaly in the network device.

Non-transitory machine-readable media for temporal matching based debugging is disclosed. In one embodiment, the non-transitory machine-readable medium has instructions stored therein, which when executed by a processor, causes the processor to perform operations in a software-defined networking (SDN) controller coupled to a SDN system. The SDN system contains a set of network devices managed by the SDN controller. The operations include: recording, at the SDN controller, messages between the SDN controller and a network device; obtaining, at the SDN controller from the network device, a set of statistics from the network device, wherein the set of statistics indicates characteristics of packet processing at the network device; temporally matching the set of statistics obtained from the network device with the messages recorded; and identifying, among the messages recorded at the SDN controller, one or more messages occurred when the set of statistics indicates a packet processing anomaly in the network device Embodiments of the disclosed techniques aim at implementing an efficient way to troubleshoot a packet processing anomaly at a network device in a SDN system.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
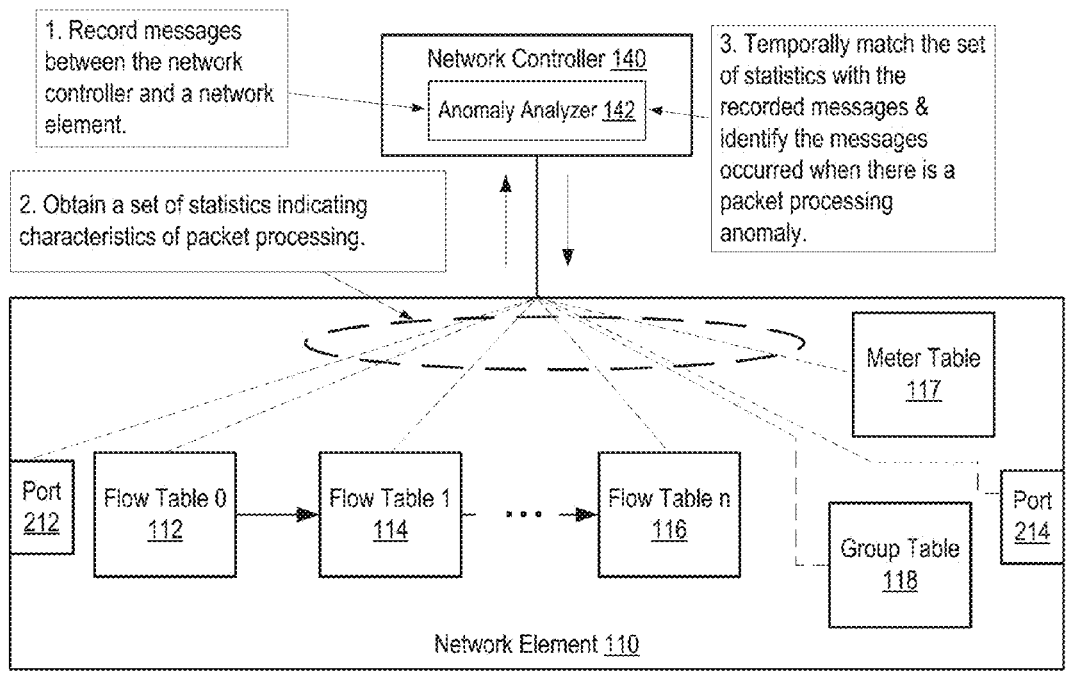
FIG. 1 illustrates temporal matching based debugging operations in a SDN system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Temporal Matching Based Debugging in a SDN System

In a software-defined networking (SDN) system, packets are forwarded through traffic flows (or simply referred to as flows), and a network element forwards the flows based on its forwarding tables, which are managed by one or more network controllers. A flow may be defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports). A network element may be implemented in one or more network devices. Similarly, a network controller may also be implemented in one or more network devices.

FIG. 1 illustrates temporal matching based debugging operations in a SDN system according to one embodiment of the invention. The SDN system 100 includes a network controller 140 managing a network element 110, and an anomaly analyzer 142 is in the network controller 140 to monitor and debug anomalies identified, including the ones relating to packet processing in network element 110.

In a network element of a SDN system, packets of traffic flows enter a port of the network element, are forwarded based on forwarding tables, and then output through another port. The forwarding table may be stored in the network element by default, and they may be also generated dynamically in the network element, often based on instructions from the SDN controller and the available resources in the network element. Forwarding tables store routing information to direct routing of incoming packets by the network element. FIG. 1 illustrates a port 212 through which packets enter the network element 110, and a port 214 through which packets exit the network element 110. Forwarding tables may have a variety of types. For example, the OpenFlow standard, such as "OpenFlow Switch Specification," Version 1.3.5, dated Mar. 26, 2015, defines flow table, group table, meter table, etc. FIG. 1 illustrates forwarding tables including flow tables 0-*n* at references 112-116, a meter table at reference 117, and a group table at reference 118. Each forwarding table may have ports defined for accessing the forwarding table, and the ports may be a physical port, a logical port, or a reserved port defined by the OpenFlow standard.

Different forwarding table includes different content. For example, each of the flow tables 0-*n* may contain one or more flow table entries, which instruct packets of a matching flow to be dropped or forwarded to one port. In contrast, a group table entry in the group table 118 may allow the network element 110 to dispose a packet to one port, one of multiple ports, or multiple ports. A meter table entry in the meter table 117 defines per-flow meters (e.g., using meter bands and counters) that allow the network element 110 to implement various quality of service (QoS) operations.

A traffic flow may traverse multiple forwarding tables when a packet is processed by a network element. The multiple forwarding tables form a service chain of the traffic flow. For example, at a forwarding table, operations are performed on the packet based on the corresponding instructions of the matching table entry. The packet may be forwarded to the group table 118 for processing, i.e., the group table 118 is a part of the service chain. After finishing the packet forwarding process, the network element 110 may forward the packet outside of the network element 110 to the next network element and/or report to the network controller 140. During the packet process, the meter table 117 may be accessed for the network element 110 to control how the packet is to be processed (e.g., at what rate the packet is processed).

The packet processing in the network element 110 is coordinated by the network controller 140. The network controller 140 may communicate with the network element 110 through communication channels (e.g., OpenFlow channels), and the network controller 140 may add, update, or delete table entries in the forwarding tables of the network element 110. The collection of the table entries in the forwarding tables forms the forwarding state of the network element 110, as changes of the table entries alter the packet forwarding/processing behaviors of the network element 110.

The network controller 140 configures and manages the network element 110, receives events from the network element 110, and sends packets out to the network element 110, all of which through messages between the network controller 140 and network element 110. The messages are in a variety of types. For example, the OpenFlow standards defines three types of messages for the communication: (1) controller-to-switch messages are messages initiated by a network controller and may or may not require a response from a network element (a switch in the context is an OpenFlow switch, which is a type of network element in this specification); (2) asynchronous messages are messages initiated by a network element and used to update the network controller about network events and changes to the forwarding state of the network element; and (3) symmetric messages initiated by either a network controller or a network element and sent without solicitation.

The controller-to-switch messages are further categorized as messages of features, configuration, modify-state, read-state, packet-out, barrier, role-request, and asynchronous-configuration. The asynchronous messages are further categorized as messages of packet-in, flow-removed, port-status, and error. The symmetric messages are further categorized as messages of hello, echo, and experimenter. These messages are constantly exchanged between a network controller and a network element during the operation of the SDN system including the network controller and the network element. When a packet processing anomaly (e.g., packets dropped unexpectedly when processed at a flow table) happens in the network element, an operator of the SDN system needs to identify the root cause of the anomaly and restore the network element back to normal. The operator often performs the troubleshooting from the network controller side as the network controller manages the control plane and likely has caused the anomaly or at least know how the anomaly comes about. However, the network controller typically manages a large number of network elements, and with each network element constantly communicates with the network controller, the network controller may process thousands and even millions messages. From the log of that many messages, the operator needs to identify the particular ones related to the anomaly, and the search is time-consuming, and often require to take the log offline for further triage. Thus, the troubleshooting is inefficient.

FIG. 1 illustrates a process to facilitate the troubleshooting. Task boxes 1 to 3 illustrate the order in which operations are performed according to one embodiment of the invention. The operations are performed in the anomaly analyzer 142 in the network controller 140. The anomaly analyzer 142 may be a hardware processor unit dedicated for troubleshooting or shared with other tasks or a software module within the network controller 140, and the anomaly analyzer 142 may also be hardware processor unit or a software module entity outside of and coupled to the network controller 140.

At task box 1, the anomaly analyzer 142 records messages between the network controller 140 and the network element 110. The recorded messages may include all the messages during a period of time (e.g., 1 day) and they are stored in a log. The recording may operate using a sliding window so that older messages are removed from the log to make room for the newer messages. The recording may be performed over a number of logs, where older logs are compressed and stored somewhere less expensive (e.g., using an offsite storage). The recording may also filter out messages based on a variety of factors. For example, the features messages (a type of controller-to-switch messages discussed above) and the messages' response identify a network element's identity and the basic capability, which typically does not change during operation, and thus the features message and the messages' responses may be filtered out when the network element's identity and the basic capability are retrieved and stored by the network controller. The log may include all the messages of several network elements in a SDN system because packets are forwarded among the network elements thus packet processing among the network elements are related (e.g., a server and a client network element for an application).

In one embodiment, the messages are stored based on timestamps of the messages only. A timestamp of a message may be the time recorded when the message is generated or processed. In another embodiment, the messages are stored in the log based also on the message types. For example, all the controller-to-switch messages for a set of network elements and responses to the controller-to-switch messages are stored together, all the asynchronous messages and responses to the asynchronous messages are stored together, and the symmetric messages and responses are stored together, and so on.

At task box 2, the anomaly analyzer 142 obtains a set of statistics indicating characteristics of packet processing in the network element 110. The set of statistics may be obtained periodically (e.g., every 5 seconds~10 minutes) through polling or self-initiated transmission by the network element 110 at a predetermined interval.

The set of statistics may include a set of statistics of a forwarding table or a port. For example, one parameter of the set of the statistics may be the count of packets or the count of bytes being processed through the flow table 1 at reference 112 during the predetermined interval. The anomaly analyzer 142 may specifically request for statistics of a particular forwarding table (one of a flow table, the group table, and the meter table) or a particular port (a physical port, a logical port, or a reserved port). The set of statistics may be obtained through messages such as a multipart_request (e.g., a read-state message from a network controller to a network element), which gets multipart_reply containing a set of the requested statistics. Thus, the set of statistics may be obtained from the recorded messages from task box 1 in one embodiment. Another set of statistics is the numbers of different messages exchanged between a network controller and a network element. Table 1 below illustrates a set of statistics on messages between a network controller and a network element, where the set of statistics includes the counts of various messages being transmitted between the network element and the network controller during the predetermined interval. One or more of the set of statistics may be used for anomaly analysis by the anomaly analyzer 142.

TABLE 1

A set of statistics of messages

| Message Type | Count |
|---|---|
| Error | 65 |
| Experimenter | 6 |
| Features_Requests | 1 |
| Feasture_Replay | 1 |
| Packet_In | 2882 |
| Flow_Removed | 3 |
| Port_Status | 8 |
| Packet_Out | 3925 |
| Flow_Mod | 465 |
| Group_Mod | 960 |
| Multipart_Request | 284 |
| Multipart_Reply | 230 |

Then at task box 3, the anomaly analyzer temporally matches the set of statistics obtained in task box 2 with the messages recorded. One way to temporally match the set of statistics with the message recorded is to plot one set of statistics over a timeline, and along the same timeline, plot the messages between the network controller and the network element. For example, the number of packets processed at a flow table can be plotted along a timeline, based on the numbers obtained at different time at task box 2. Then along the same timeline, the occurrence of flow modification messages (often referred to as flow_mod messages, e.g., OpenFlow messages with the type file set to OFPT_FLOW-_MOD in compliance with the OpenFlow standards) sending from the network controller 140 to the network element 110 may also be plotted. A flow modification message is a message that modifies a flow table entry, and the modification may change behaviors of a flow table (thus affecting the statistics collected). When an anomaly occurs in packet processing at the flow table, the number of processed packets should drop (as some packets are dropped). When the anomaly is triggered by a flow modification message, the flow modification message(s) transmitted to the network element at the time the number of processed packet drops should be the primary suspect for causing the packet processing anomaly. Thus, the operator should investigate the flow modification message(s) first.

A number of types of messages may cause a packet processing anomaly. Thus, a plurality of sets of statistics may be plotted along the same timeline, each set of statistics being for one particular type of messages. One group of messages are the messages that change the forwarding state of a network element, including the group modification messages (often referred to as group_mod messages, e.g., OpenFlow messages with the type field set to OFPT_GROUP_MOD in compliance with the OpenFlow standards) that modify group table entries, the port modification messages (often referred to as port_mod messages, e.g., OpenFlow messages with the type field set to OFPT_PORT_MOD in compliance with the OpenFlow standards) that modify the behavior of a port, and the meter modification messages (often referred to as meter_mod messages, e.g., OpenFlow messages with the type field set to OFPT_METER_MOD in compliance with the OpenFlow standards) that modify a meter. Another group of messages are the messages that indicate the forwarding state changes of a network element, including multipart message requests and multipart message replies (e.g., OFPT_MULTIPART_REQUEST and OFPT_MULTIPART_REPLY messages) that collect statistics of individual flows, aggregate flows, tables, table features, ports, port description, queues, group, group description, group features, meters, meter configuration, experimenter multipart, and that alike.

Through temporally matching a set of statistics with the recorded message and identifying the message or messages occurred when there is a packet processing anomaly at a network element, the troubleshooting of the packet processing anomaly can quickly focus on the message or the messages that have likely triggered the anomaly at the network element without going through all the messages during a time period between the network element and a network controller in the log.

The selection of the message to temporally match with the set of statistics may be adjusted based on the nature of the statistics and from which entity of the network element that the set of statistics is retrieved. For example, when the set of statistics is from a group table, the messages to temporally match the set of statistics may be performed in the order of: the group modification messages, the multipart messages for group statistics, and the multipart messages for group features. That is, the messages that more likely have caused an anomaly are matched first with the set of statistics in one embodiment, thus the troubleshooting process may be further accelerated.

Figure 2:
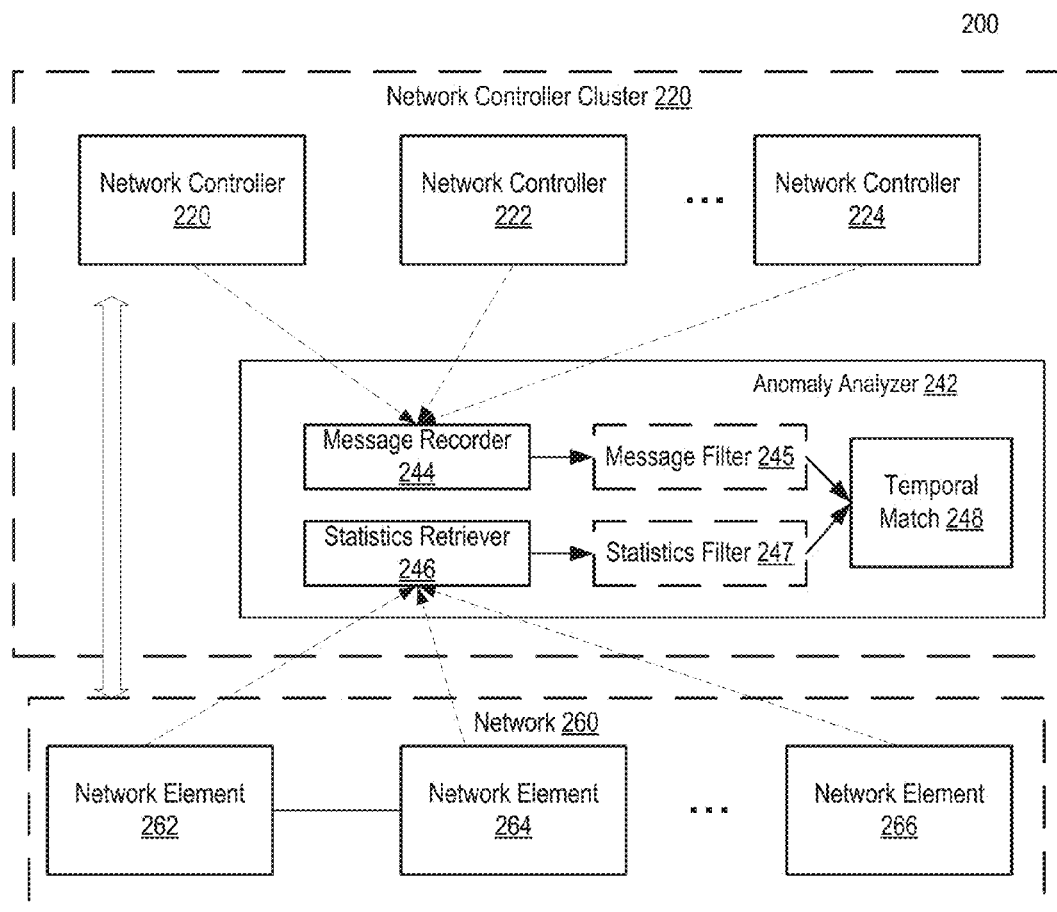
FIG. 2 illustrates a SDN system according that may be used for temporal matching based debugging according to one embodiment of the invention.

FIG. 2 illustrates a SDN system according that may be used for temporal matching based debugging according to one embodiment of the invention. The SDN system 200 includes a network controller cluster 220 that manages a set of network elements in a network 260. The network controller cluster 220 includes a set of network controllers 220-224, and they may share the role of managing the network 260. For example, the network controllers 220-224 may form active and standby pairs, and they may perform load-sharing where each network controller manages a portion of the network 260 or performs a set of particular functions for managing the network 260.

An anomaly analyzer 242 may be a standalone unit outside a particular network controller but within the network controller cluster 220. The anomaly analyzer 242 may also be a unit within a network controller in an alternative embodiment. The anomaly analyzer 242 contains several functional modules, and some or all of functional modules may be implemented with a dedicated or shared hardware processor and coupled memory in one embodiment. In an alternative embodiment, the illustrated functional modules in the anomaly analyzer 242 may be software modules stored in a non-transitory storage medium coupled to a processor to perform the operations to identify messages between one of the network controller and a network element, where the messages have caused a packet processing anomaly in a network element as discussed in relation to FIG. 1.

Particularly, in one embodiment, the anomaly analyzer 242 includes a message recorder 244, a statistics retriever 246, and a temporal match module 248. The message recorder 244 is configured to record messages between a network controller within the network controller cluster 220 and a network element within the network 260. The statistics retriever 246 is to obtain a set of statistics from a network element, where the set of statistics indicates characteristics of packet processing at the network element. The temporal match module 248 is to temporally match the set of statistics obtained from the network element with the messages recorded and identify one or more messages occurred when the set of statistics indicating a packet processing anomaly in the network element. The identified one or more messages are then analyzed to determine whether or not the messages caused the packet processing anomaly, and if a message did cause the anomaly, the anomaly analyzer 242 or another processing unit within the network controller cluster 220 or a network controller within determines the proper remedial measure to remove the packet processing anomaly.

In one embodiment, the anomaly analyzer 242 also includes a message filter 245 and/or a statistics filter 247. The message filter 245 is to filter messages recorded so that only the messages relates to a particular set of statistics are sent to the temporal match module 248. For different sets of statistics to match, the message filter 245 may select different sets of messages, in a suitable priority order as discussed herein above. The statistics filter 247 may select a set of statistics from the statistics retriever 246 to send to the temporal match module 248. The selection may be based on a known packet processing anomaly. For example, if it is observed that packet has been dropped at the flow table 1 at reference 114, the statistics filter 247 may be requested to select the statistics relating to the flow table 1 (e.g., packet or bytes processed) to the temporal match module 248 for matching.

Temporal Matching of Statistics and Messages

Figure 3:
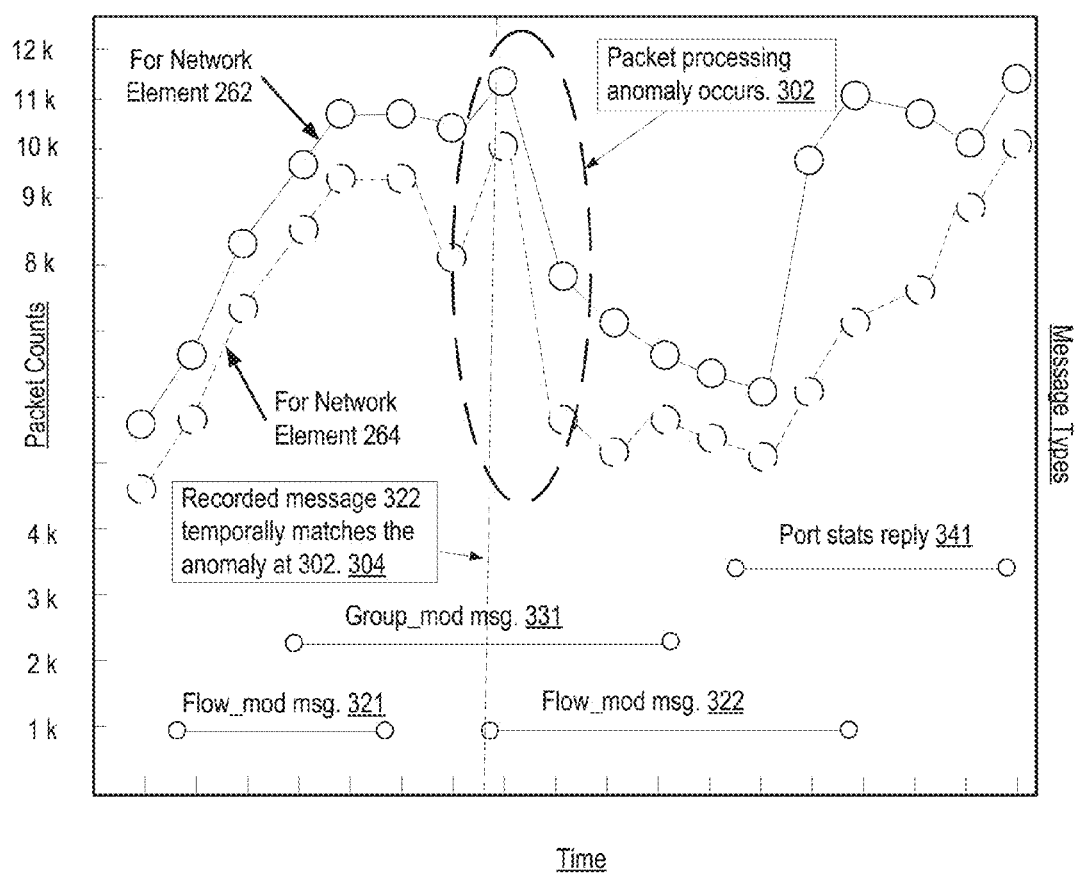
FIG. 3 illustrates temporal matching of statistics and messages in a graph according to one embodiment of the invention.

FIG. 3 illustrates temporal matching of statistics and messages in a graph according to one embodiment of the invention. The graph 300 has one x-axis and two y-axes. The x-axis is time, which may be an absolute time or a relative time starting from a reference point. The y-axis at the left is the packet counts, indicating the packet has been processed in a particular interval. One solid line is drawn for the network element 262 and the line illustrates the number of packets processed at the last flow table (e.g., the flow table 15) of the network element 262. A dotted line is also drawn, and it is for illustrating the number of packets processed at the first flow table (e.g., the flow table 0) of the network element 264. As the network element 262 are connected to the network element 264 as illustrated in FIG. 2, the packet processing at the last flow table at the former should be correlated to the first flow table of the latter. The closeness of the number of packets processed tracked by the two lines appears to validate the assumption.

The y-axis at the right tracks the message types. While many types (and categories within the types) of messages may be plotted in the graph, flow modification messages, group modification messages, and port statistics reply messages are used to illustrate the matching process. Each message is plotted in the graph starting at a time as the timestamp of the message indicates. The length of the message in the graph may be predetermined by the operator of a SDN system, and the messages of the same type and category have the same time duration, while the messages of different types and categories may have different time duration. For example, a flow modification message may last a duration within 1~10 seconds, a group modification message may last a duration within 1~15 seconds, and a port statistics reply may last a duration within 1~5 seconds. The duration for messages of each type and category may be adjusted based on the historical impact of a particular type and category at a given SDN system and a given network element. For example, when it is determined that the impact of port statistics reply message on a network element is brief because there are not many port statistics collected from the network element, the duration of the port statistics reply message may be shorten (e.g., from 5 seconds to 1 seconds). Different type of messages are plotted at different height in the graph. In this example, the port stats reply message occurred once during the time the graph is generated for and that is port stats reply 341; the group modification message also occurred once and that is group modification message 331; and the flow modification message occurred twice and they are flow modification messages 321 and 322.

An operator may identify a packet processing anomaly through an anomaly analyzer (e.g., the anomaly analyzer 142 or 242) based on the plotted numbers of packets processed. In this example, a packet processing anomaly appears to start at reference 302, where both the lines for the network elements 262 and 264 drops significantly. That is, around that time, more packets are dropped instead of being processed at the monitored flow tables comparing to just the moment before. The anomaly may be caused by network element hardware failure or tables/ports programming problems within the network element. Regardless of the root cause of the packet drop, the anomaly analyzer may pinpoint what may have happened through debugging the messages recorded.

The anomaly analyzer may search for a recorded message from all the recorded messages that also occurred around that time. In this example, the flow modification message 322 occurred. Thus, the anomaly analyzer may investigate the flow modification message 322 and determine whether or not the flow modification message 322 may have caused the packet processing drop, and how to remove the anomaly if the flow modification message 322 indeed have caused the packet processing drop. For example, another flow modification message may be sent the network element 262 so a flow table entry causing the anomaly may be corrected and the corresponding flow table (the last flow table, flow table 15 for example) in the network element 262 may function properly.

Figure 4:
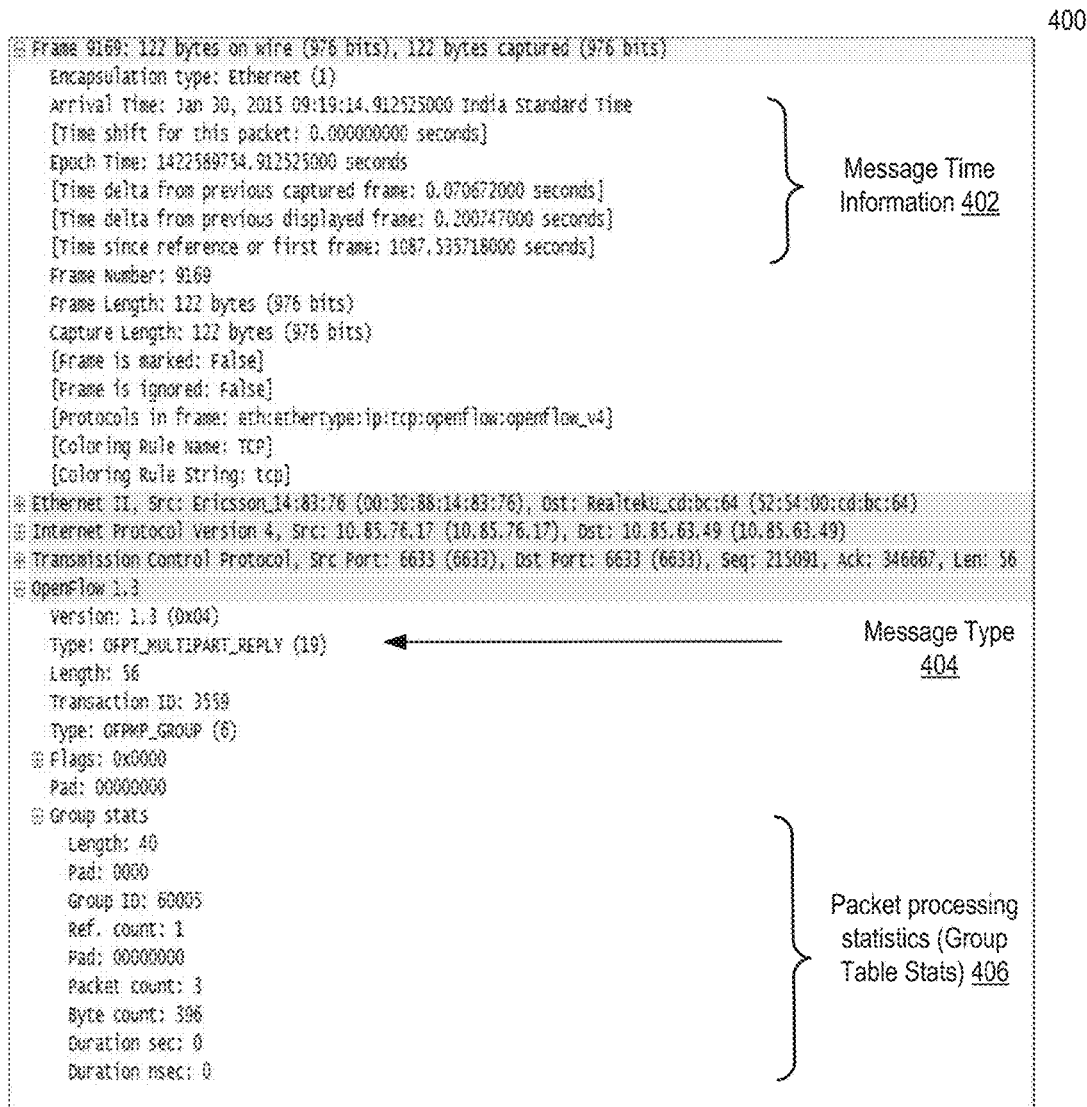
FIG. 4 illustrates a message utilized in temporal matching based debugging according to one embodiment of the invention.

FIG. 4 illustrates a message utilized in temporal matching based debugging according to one embodiment of the invention. A message like the illustrated message 400 is recorded at a network controller, and is accessible by an anomaly analyzer. The illustrated message is in compliance with the OpenFlow standard, thus the format is understood by a person of ordinary skill in the art. The message 400 includes message time information at reference 402. The time includes an absolute time (Jan. 30, 2015 09:19: 14.912525000 India Standard Time), and multiple relative time including the time delta and time since reference or first frame. The time recorded is the time that may be used to plot the message in a graph like the graph 300. The message is a multipart reply message as indicated at reference 404. The OFPT_MULTIPART_REPLY message is in compliance with OpenFlow version 1.3 standard, and it is for a group status (type: OFPMP_GROUP) as indicated. The message 400 includes packet processing statistics at reference 406, and the statistics include a packet count 3, a byte count 396, etc. Thus the message 400 may be used for obtaining the statistics indicating the characteristics of packet processing at the corresponding network element, thus the message 400 may be used to plot the packet count line in a graph such as graph 300 too.

Flow Diagrams

Figure 5:
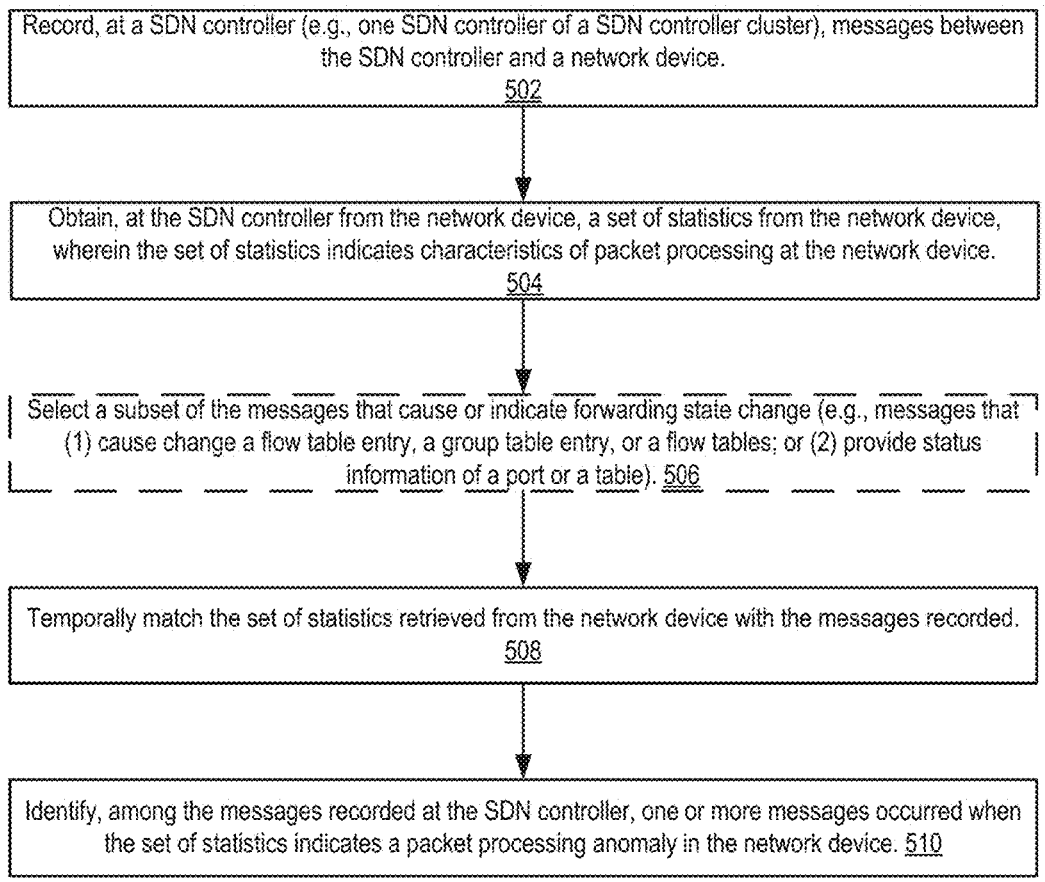
FIG. 5 is a flow diagram illustrating operations of temporal matching based debugging according to one embodiment of the invention.

FIG. 5 is a flow diagram illustrating operations of temporal matching based debugging according to one embodiment of the invention. A method 500 may be implemented in a SDN controller such as the network controller 140 or the network controller cluster 220 according to one embodiment of the invention. The method 500 may be implemented in an anomaly analyzer 142 or 242 of a network device according to one embodiment of the invention. The SDN controller and the network elements managed by the SDN controller, each may be implemented in one or more network devices.

At reference 502, messages between the SDN controller and a network device are recorded at the SDN controller. At reference 504, a set of statistics from the network device is obtained, where the set of statistics indicates characteristics of packet processing at the network device. In one embodiment, the set of statistics is obtained through the SDN controller sending a request for the set of statistics to the network device and receiving a sequence of multipart messages from the network device. The request and the sequence of multipart messages may be in the format of multipart request and reply. The set of statistics may be statistics of a port or a table of the network device. In one embodiment, the set of statistics includes a count of packets or bytes processed by the port or the table of the network device as discussed herein above.

The messages are in compliance with the OpenFlow standards according to one embodiment of the invention, and the messages may be recorded in one or more logs stored in a database accessible for the debugging process. As discussed herein above, the message may be further filtered for debugging purpose. In one embodiment, at reference 506, a subset of the messages that cause or indicate forwarding state changes in the network device is selected. The subset of the messages may be one of the messages that (1) cause changes to a flow table entry (e.g., flow modification messages); (2) cause changes to a group table entry (e.g., group modification messages); or (3) cause changes to a flow table (e.g., table feature messages such as OFPMP_T-ABLE_FEATURES defined in the OpenFlow standard). The subset of the messages may also be one of the messages that requests or provides status information of a port or a table of the network device (e.g., the multipart request and reply messages such as OFPT_MULTIPART_REQUEST or OFPT_MULTIPART_REPLY messages defined in the OpenFlow standards). In one embodiment, the subset of the messages includes controller-to-switch messages in compliance with OpenFlow Switch standards and responses to the controller-to-switch messages from the network device. It is to be noted that the set of statistics may be obtained through the messages in one embodiment.

At reference 508, the set of statistics is temporally matched with the messages recorded. The temporal matching may be matching the recorded messages with the set of statistics, so that an anomaly analyzer may determine the correlation between the recorded message and the changes of values within the set of statistics. The process may be performed through plotting a graph as illustrated in FIG. 4.

Figure 6:
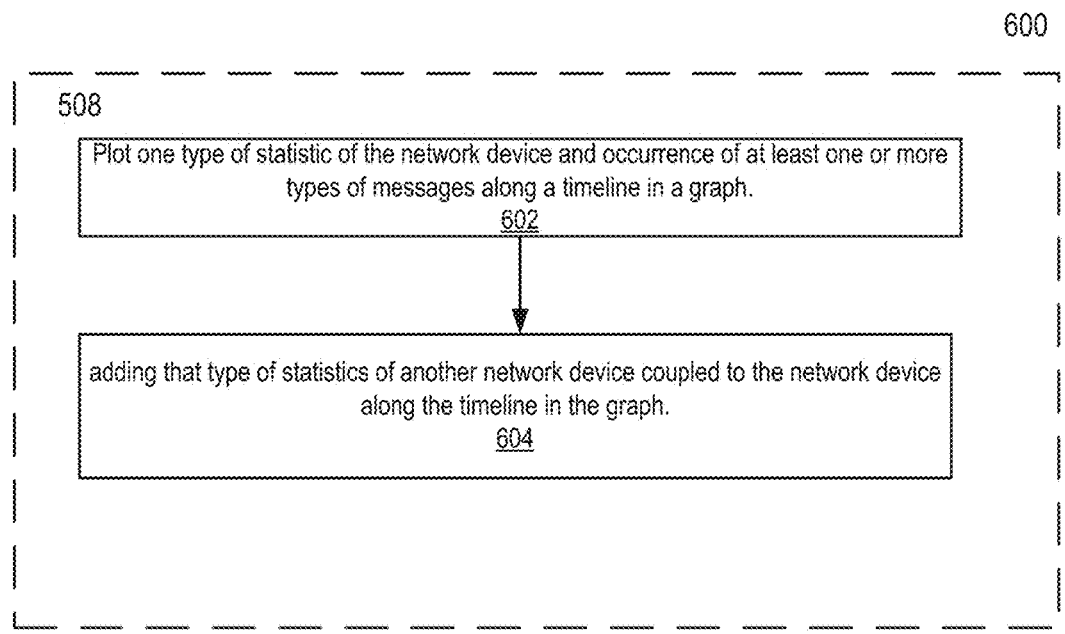
FIG. 6 illustrates the process of correlating statistics of two network devices according to one embodiment of the invention.

FIG. 6 illustrates the process of correlating statistics of two network devices according to one embodiment of the invention. The method 600 is one embodiment of reference 508. At reference 602, one type of statistics of the network device and occurrence of at least one type of messages are plotted along a timeline in a graph. At reference 604, that type of statistics of another network device coupled to the network device is also plotted along the timeline in the graph. The coupled other network device may be one that is immediately adjacent to the network device.

Referring back to FIG. 5, at reference 510, one or more messages is identified, where the one or more messages occurred when the set of statistics indicates a packet processing anomaly in the network device. The packet processing anomaly may be a rapid change in the counts of the processed packets or bytes in the obtained set of statistics, which indicates the monitored flow table, group table, meter table, or port in the network device misbehaving. Thus, the one or more messages occurred at the time need to be investigated. If the root cause of the anomaly is identified, a SDN controller may transmit a message to the network device to remove the anomaly.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
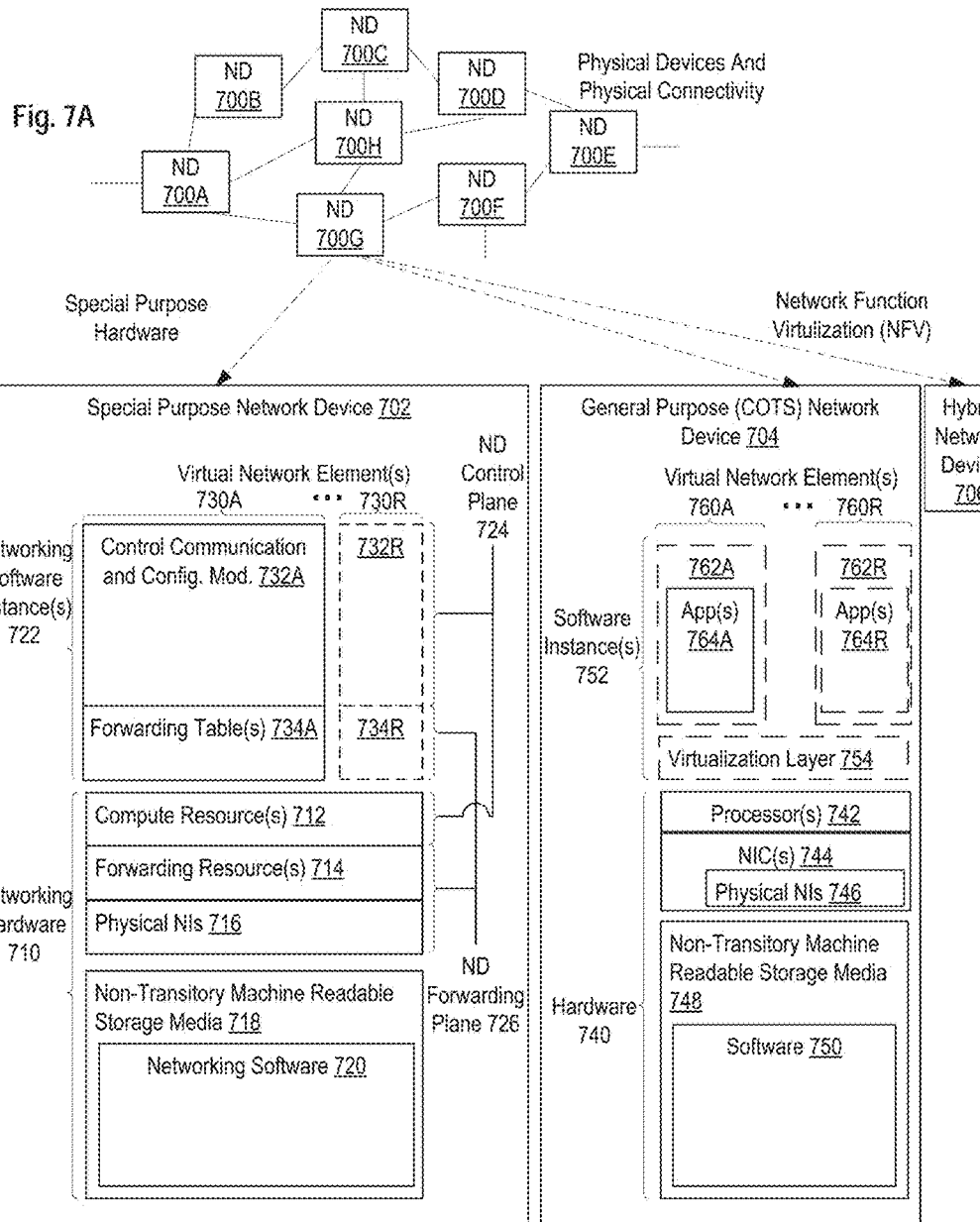
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special purpose network device 702 that uses custom application-specific integrated-circuits (ASICs) and a proprietary operating system (OS); and 2) a general purpose network device 704 that uses common off-the-shelf (COTS) processors and a standard OS.

The special purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720, which is a software module configured on special purpose network device 702 and can communicate with a network controller for the temporally matching debug process (e.g., transmitting statistics of the network device to the network controller). A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a networking software instance, which perform methods discussed herein above such as methods 500-600. Each of the networking instances and that part of the networking hardware 710 that executes that instance (be it hardware dedicated to that networking software instance and/or time slices of hardware temporally shared by that networking software instance with others of the networking software instance), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
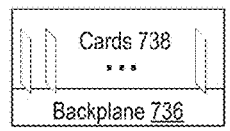
FIG. 7B illustrates an exemplary way to implement a special purpose network device according to some embodiments of the invention.

FIG. 7B illustrates an exemplary way to implement the special purpose network device 702 according to some embodiments of the invention. FIG. 7B shows a special purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750, which may also contain the memory selector 212. During operation, the processor(s) 742 execute the software 750 to instantiate one or more sets of one or more applications 764A-R. While one embodiment does not implement virtualization, alternative embodiments may use different forms of virtualization—represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 7C:
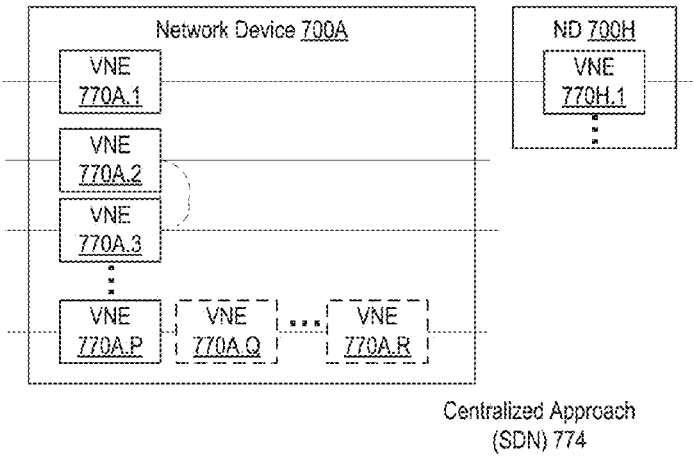
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., 1P/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
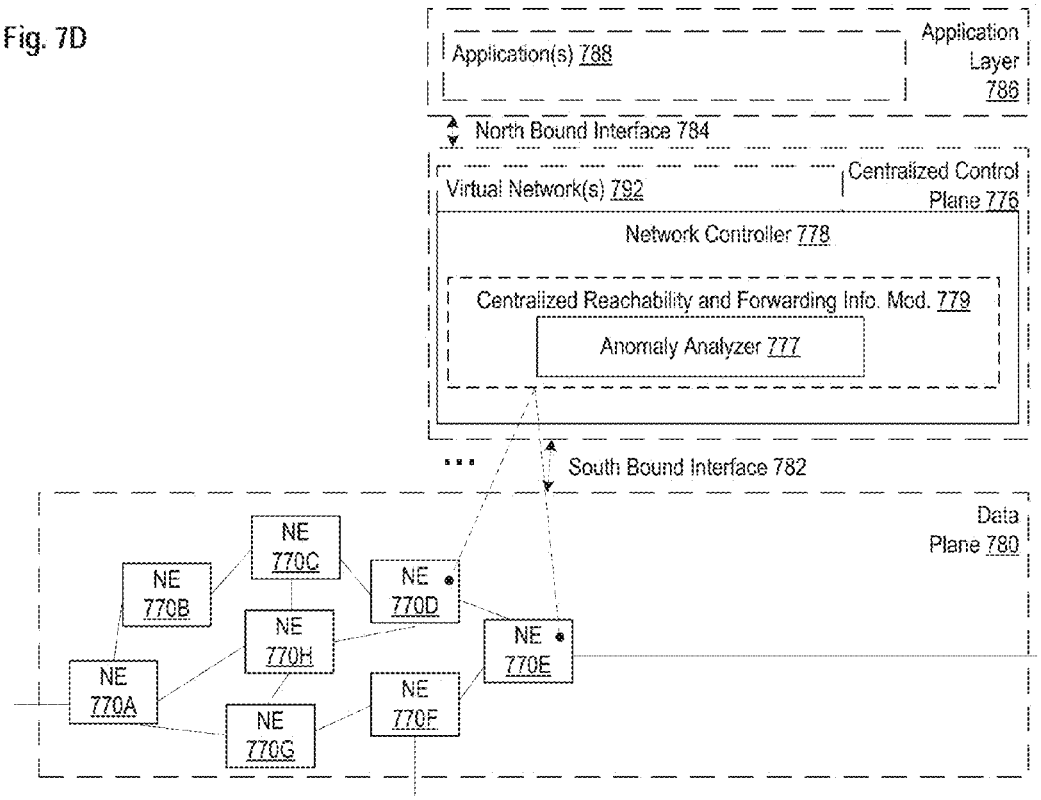
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A. Specifically, FIG. 7D illustrates network elements (NEs) 770A-H with the same connectivity as the NDs 700A-H of FIG. 7A with a centralized approach for maintaining reachability and forwarding information (also called network control), according to some embodiments of the invention.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). The centralized reachability and forwarding information module 779 contains an anomaly analyzer 777, which can be one of the anomaly analyzer 142 or 242 as illustrated in, and described with reference to, FIGS. 1-2.

The network intelligence is centralized in the centralized control plane 776 executing on electronic devices that are typically separate from the NDs. For example, where the special purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/ VNEs, and it maps the virtual networks to the underlying NDs efficiently (including maintaining these mappings as the physical network changes either through hardware (ND, link, or ND component) failure, addition, or removal).

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
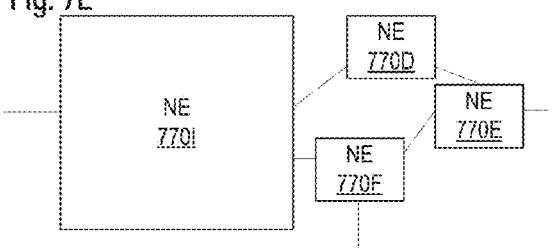
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
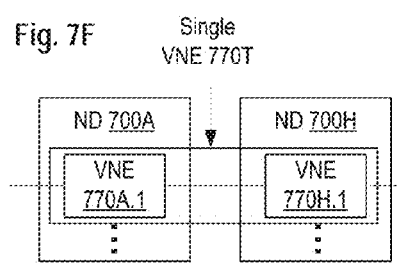
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
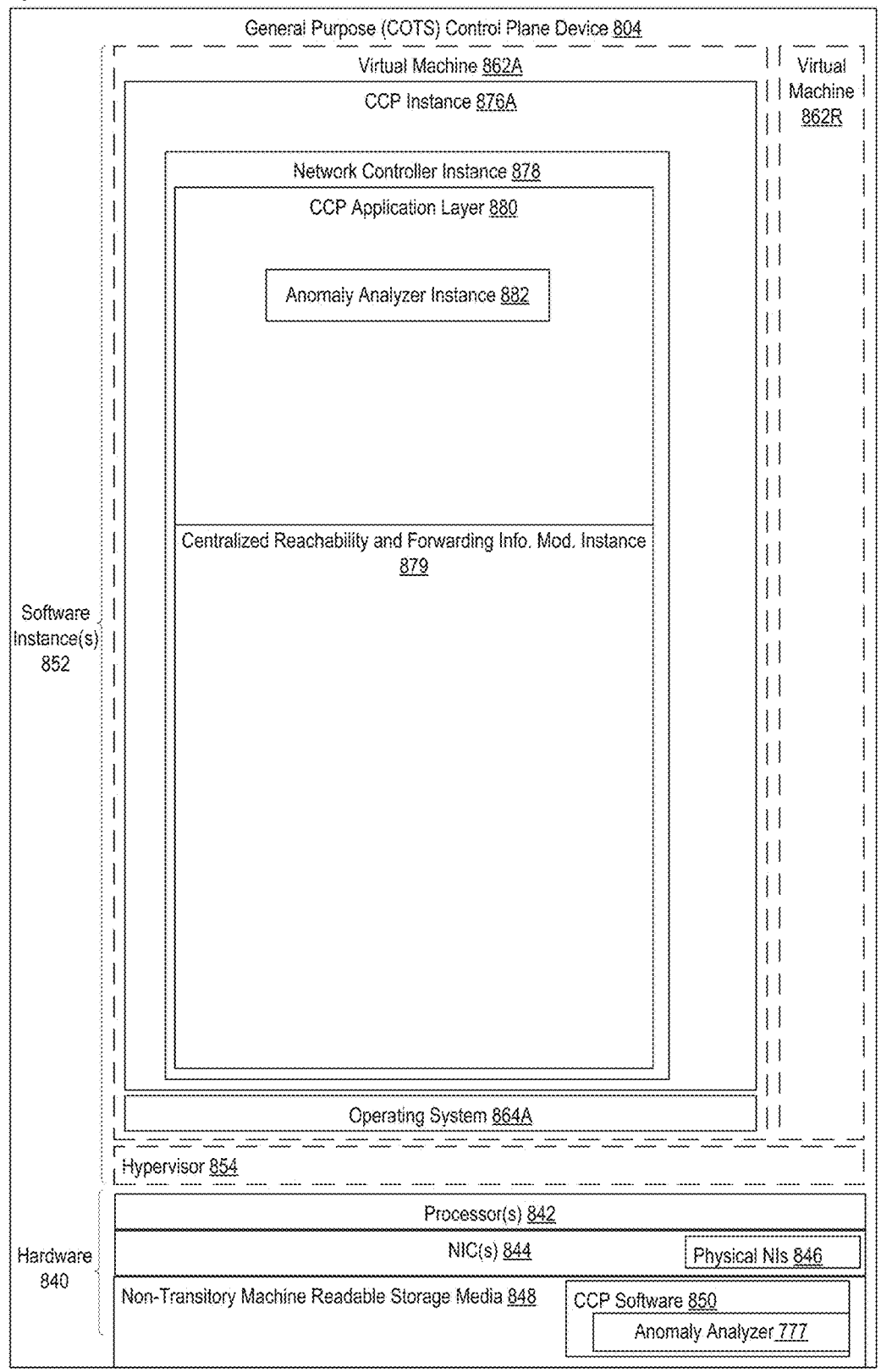
FIG. 8 illustrates a general purpose control plane device with centralized control plane (CCP) software 850, according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850. The CCP software 850 may include the anomaly analyzer 777 discussed herein above.

In embodiments that use compute virtualization, the processor(s) 842 typically execute software to instantiate a virtualization layer 854 and software container(s) 862A-R (e.g., with operating system-level virtualization, the virtualization layer 854 represents the kernel of an operating system (or a shim executing on a base operating system) that allows for the creation of multiple software containers 862A-R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 850 (illustrated as CCP instance 876A) is executed within the software container 862A on the virtualization layer 854. In embodiments where compute virtualization is not used, the CCP instance 876A on top of a host operating system is executed on the "bare metal" general purpose control plane device 804. The instantiation of the CCP instance 876A, as well as the virtualization layer 854 and software containers 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry The operations of the flow diagram FIGS. 5-6 are described with reference to the exemplary embodiment of FIGS. 1-2, 7A-F, and 8. However, it should be understood that the operations of flow diagrams can be performed by embodiments of the invention other than those discussed with reference to the exemplary embodiment of FIGS. 1-2, 7A-F, and 8, and the exemplary embodiment of FIGS. 1-2, 7A-F, and 8 can perform operations different than those discussed with reference to the flow diagram of FIG. 5-6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a software-defined networking (SDN) controller coupled to a SDN system, wherein the SDN system contains a set of network devices managed by the SDN controller, the method comprising:
   recording, at the SDN controller, messages between the SDN controller and a network device;
   obtaining, at the SDN controller from the network device, a set of statistics from the network device, wherein the set of statistics indicates characteristics of packet processing at the network device;
   temporally matching, by the SDN controller, the set of statistics obtained from the network device with the messages recorded; and
   identifying by the SDN controller, among the messages recorded at the SDN controller, one or more messages occurred at a time when a packet processing anomaly appears in the network device, wherein the SDN controller determines the packet processing anomaly based on the set of statistics, and wherein a root cause of the packet processing anomaly is identified based on the one or more messages.

2. The method of claim 1, wherein the SDN controller is one of a plurality of SDN controllers within a controller cluster of the SDN system.

3. The method of claim 1, further comprising:
   selecting a subset of the messages that cause or indicate forwarding state changes in the network device prior to temporally matching with the set of statistics.

4. The method of claim 3, wherein the subset of the messages includes at least one of messages that:
   cause a flow table entry, a group table entry, or a flow table to change, and
   request or provide status information of a port or a table of the network device.

5. The method of claim 3, wherein the subset of the messages includes controller-to-switch messages in compliance with OpenFlow Switch standards and responses to the controller-to-switch messages from the network device.

6. The method of claim 1, wherein temporally matching the set of statistics with the messages comprises:
   plotting one type of statistic of the network device and occurrence of at least one types of messages along a timeline in a graph.

7. The method of claim 6, further comprising:
   adding that type of statistics of another network device coupled to the network device along the timeline in the graph.

8. The method of claim 1, wherein obtaining the set of statistics from the network device comprises:
   sending a request for the set of statistics from the SDN controller to the network device; and
   receiving a sequence of multipart messages from the network device.

9. The method of claim 1, wherein the set of statistics are statistics of a port or a table of the network device.

10. The method of claim 9, wherein the set of statistics includes a count of packets processed by the port or the table of the network device.

11. A software-defined networking (SDN) controller coupled to a SDN system, wherein the SDN system contains a set of network devices managed by the SDN controller, the SDN controller comprising:
 a processor and a non-transitory machine-readable storage medium that coupled to the processor, the non-transitory machine-readable storage medium containing instructions executable by the processor, wherein the SDN controller is operative to:
  record messages between the SDN controller and a network device,
  obtain, from the network device, a set of statistics from the network device, wherein the set of statistics indicates characteristics of packet processing at the network device,
  temporally match the set of statistics obtained from the network device with the messages recorded, and
  identify among the messages recorded at the SDN controller, one or more messages occurred at a time when a packet processing anomaly appears in the network device, wherein the SDN controller determines the packet processing anomaly based on the set of statistics, and wherein a root cause of the packet processing anomaly is identified based on the one or more messages.

12. The SDN controller of claim 11, wherein the SDN controller is one of a plurality of SDN controllers within a controller cluster of the SDN system.

13. The SDN controller of claim 11, wherein the SDN controller is further operative to select a subset of the messages that cause or indicate forwarding state changes in the network device prior to temporally matching with the set of statistics.

14. The SDN controller of claim 11, wherein temporally matching the set of statistics with the messages is to:
 plot one type of statistic of the network device and occurrence of at least one or more types of messages along a timeline in a graph.

15. The SDN controller of claim 14, wherein temporally matching the set of statistics with the messages is further to:
 add that type of statistics of another network device coupled to the network device along the timeline in the graph.

16. A non-transitory machine-readable medium having instructions stored therein, which when executed by a processor, cause the processor to perform operations in a software-defined networking (SDN) controller coupled to a SDN system, wherein the SDN system contains a set of network devices managed by the SDN controller, the operations comprising:
 recording, at the SDN controller, messages between the SDN controller and a network device;
 obtaining, at the SDN controller from the network device, a set of statistics from the network device, wherein the set of statistics indicates characteristics of packet processing at the network device;
 temporally matching, by the SDN controller, the set of statistics obtained from the network device with the messages recorded; and
 identifying by the SDN controller, among the messages recorded at the SDN controller, one or more messages occurred at a time when a packet processing anomaly appears in the network device, wherein the SDN controller determines the packet processing anomaly based on the set of statistics, and wherein a root cause of the packet processing anomaly is identified based on the one or more messages.

17. The non-transitory machine-readable medium of claim 16, the operations further comprising:
 selecting a subset of the messages that cause or indicate forwarding state changes in the network device prior to temporally matching with the set of statistics.

18. The non-transitory machine-readable medium of claim 16, wherein temporally matching the set of statistics with the messages comprises:
 plotting one type of statistic of the network device and occurrence of at least one or more types of messages along a timeline in a graph.

19. The non-transitory machine-readable medium of claim 18, the operations further comprising:
 adding that type of statistics of another network device coupled to the network device along the timeline in the graph.

20. The non-transitory machine-readable medium of claim 16, wherein retrieving the set of statistics from the network device comprises:
 sending a request for the set of statistics from the SDN controller to the network device; and
 receiving a sequence of multipart messages from the network device.

* * * * *